United States Patent
Guerra et al.

(10) Patent No.: US 7,732,017 B2
(45) Date of Patent: Jun. 8, 2010

(54) EFFECT PAINT

(75) Inventors: Antonio Guerra, Arona (IT); Biagio Pezzuto, Arona (IT); Ugo Mantellino, Galliate (IT)

(73) Assignee: Akzo Nobel Coatings International B.V., Arnhem (NL)

( * ) Notice: Subject to any disclaimer, the term of this patent is extended or adjusted under 35 U.S.C. 154(b) by 184 days.

(21) Appl. No.: 10/591,037

(22) PCT Filed: Mar. 15, 2005

(86) PCT No.: PCT/EP2005/002821
§ 371 (c)(1),
(2), (4) Date: Jun. 15, 2007

(87) PCT Pub. No.: WO2005/090491
PCT Pub. Date: Sep. 29, 2005

(65) Prior Publication Data
US 2008/0044581 A1 Feb. 21, 2008

(30) Foreign Application Priority Data
Mar. 17, 2004 (EP) .................. 04075853

(51) Int. Cl.
*B05D 1/28* (2006.01)
*B05D 1/40* (2006.01)
*B05D 3/12* (2006.01)
*C09D 5/02* (2006.01)
*C09D 5/28* (2006.01)
*C09D 7/12* (2006.01)

(52) U.S. Cl. ............ 427/402; 118/264; 427/261; 427/264; 427/355; 525/217; 525/227; 525/231

(58) Field of Classification Search .......... 427/402
See application file for complete search history.

(56) References Cited

U.S. PATENT DOCUMENTS

| 5,498,670 | A | * | 3/1996 | Aoyama et al. ............. 525/217 |
| 6,478,925 | B2 | * | 11/2002 | Edwards et al. ........... 156/580.1 |
| 7,335,399 | B2 | * | 2/2008 | Bolton et al. ............... 427/264 |
| 2004/0091704 | A1 | * | 5/2004 | Weihrauch et al. .......... 428/364 |
| 2004/0158949 | A1 | * | 8/2004 | Booth et al. ............... 15/210.1 |

FOREIGN PATENT DOCUMENTS

| EP | 0 352 804 B1 | 3/1996 |
| GB | 1 111 223 | 4/1968 |
| JP | 2000256970 A | * 9/2000 |
| WO | WO 03/031523 A1 | 4/2003 |

OTHER PUBLICATIONS

McGeary, Dennis. "Paintings by Dennis McGeary". GalleryMcGeary. http://web.archive.org/web/20010303065331/http://gallerymcgeary.com/textured.html (2001).*
International Search Report mailed Aug. 9, 2005, Application No. PCT/EP2005/002821 filed Mar. 15, 2005; Written Opinion of the International Searching Authority.

* cited by examiner

*Primary Examiner*—Michael Kornakov
*Assistant Examiner*—Alexander Weddle
(74) *Attorney, Agent, or Firm*—Kenyon & Kenyon LLP

(57) ABSTRACT

Emulsion paint composition for obtaining special textile or suede effect comprising a filler at least partly consisting of pre-pigmented spherical aliphatic polyurethane particles. About 3-10% of the spherical particles has a particle size between 63-90 micrometers and 25-40% of the spherical particles has a particle size between 40-63 micrometers. Before applying the paint as a semi-opaque top coat the substrate is first coated with an opaque acrylic primer of a corresponding color and subsequently dried. The top coat is applied by brush in cross way fashion to obtain a suede effect, or it can be applied by roller, while subsequently a tool is used comprising a flat side provided with stiff parallel projecting fibers such as synthetic grass fibers which are dragged over the fresh paint layer to obtain a linen effect.

7 Claims, No Drawings

EFFECT PAINT

The present invention relates to a method of painting a substrate, in particular a wall, with an emulsion paint having a special visual and/or tactile effect, such as a textile, velvety or soft-feel effect. The present invention also relates to a paint system to be used in such a method, and to substrates painted using said method.

A textile or a soft-feel effect of a paint film is generally obtained by using polyurethane particles as a filler. U.S. Pat. No. 5,498,670 discloses a coating composition with spherical particles of polyurethane. British patent application GB-A 1 111 233 discloses a velvet-effect paint comprising spherical polyurethane particles. In EP-A 0 352 804 a textile effect is obtained by using a paint with vinyl chloride particles.

Larger particles, e.g. of about 90 microns or larger, generally result in a cloudy effect, visually comparable to suede. However, the use of such particles results in a relatively rough feel. Smaller particles, on the other hand, give a soft feel but only a very limited visual textile or suede effect. Hence, a tactile effect requires a small particle size, while at the same time a visual effect is obtained only by using larger particles.

It is the object of the invention to provide a paint composition balancing visual textile effects on the one hand and tactile effects on the other. A further object of the invention is to allow the creation of different effects, such as suede, linen-like, or cloth-like effects, with the same system.

The object of the invention is achieved by means of a method of painting a substrate by first applying an opaque coating and subsequently applying a semi-opaque layer of an emulsion paint comprising spherical polymer particles having a particle size distribution, with 3-10% of the spherical particles having a particle size between 63-90 micrometers and 25-40% of the spherical particles having a particle size between 40-63 micrometers. Surprisingly, it was found that this results in a combination of a noticeable soft-feel tactile effect and a textile or suede look as a visual effect.

In this respect, an opaque coating is a completely hiding layer of coating material. A semi-opaque or semi-transparent paint layer is a layer which is not completely hiding its substrate. The colour of the substrate is still partly visible and shines through. This way the substrate contributes to the final visual appearance. A semi-opaque layer can be obtained by applying very thin layers or by using paints or lacquers with transparent pigments or with a pigment content which is not sufficient to achieve complete hiding of the substrate with a normally applied layer of usual thickness. Usual thicknesses for emulsion paints can be as much as 150-200 micrometers.

The particles or beads should be substantially spherical. This means that the shape of the particles should be free of angular irregularities. The spherical particles can be made of any suitable polymer material, such as acrylic or vinyl polymers. However, polyurethane particles are preferred, particularly aliphatic polyurethane particles.

The specific density of the particles can for instance range between 0.8-1.5 g/cm$^3$, e.g. between 1.1-1.3 g/cm$^3$.

Preferably, the spherical particles are pre-pigmented. The particles can be pre-pigmented with any suitable organic or inorganic pigment, such as for instance titanium dioxide or carbon black. The pigment content of the particles can for example be between 3-40%, although higher or lower contents may also be used if so desired. Using titanium dioxide, good results were obtained with a pigment content of 12-15% by weight.

A particularly suitable example of a filler made of pre-pigmented aliphatic polyurethane particles is Decol® 40, which has an average particle size of about 40 micrometers, a density of 1.21 g/cm$^3$, and a titanium dioxide content of 13.5% by weight.

The emulsion paint further comprises an emulsified binder and an aqueous carrier. Suitable binders are for example polymers obtained by homo-polymerization or copolymerization of vinyl monomers, styrene building blocks, or acrylic monomers, such as alkyl (meth)acrylates, e.g. butyl acrylate, and the like. Copolymers of butyl acrylate and styrene are preferred.

Although the emulsion paint is applied in semi-opaque dried paint films, the composition may optionally further comprise organic or inorganic pigments or further fillers. Also further paint additives can be used such as pigment dispersants, emulsifiers, surfactants, thickeners, thixotropic agents, and the like.

The emulsion paint with the spherical particles can comprise further additives, such as thickeners, surfactants, dispersants, coalescent aids, etc. Preferably, the paint will comprise a polyethylene wax. Further, it was found that the textile effect is improved if wood fibres are used which give the paint film a warm touch. Preferably, the wood fibres have a length between 25-35 microns.

The substrate is first coated to obtain an opaque first coating, which can be applied in two or more layers, although a single layer may also be used if so desired. The first coating can for instance be made of a water-borne emulsion paint. As in the case of the paint composition described above, this primer can for instance be an emulsion of a vinyl or acrylic polymer, such as a styrene acrylic copolymer. A commercially available example of such an emulsion is HydroPliolite® available from Eliokem, at 9% volume solids in the emulsion paint.

The paint for the first opaque coating can also comprise pigments, such as titanium dioxide, carbon black, etc., or extender pigments, such as talc, calcium carbonate or mica pigments. Preferably, the colour of the primer should be in accordance with the colour of the paint layer with the spherical particles.

The first coating can also comprise a thickener, such as for instance a cellulose or polyurethane compound. If so desired, further paint additives like xylan may also be used.

The first coating can be applied, e.g., by means of a brush or a roller. Medium hair rollers give the best results for this system. After the primer has been applied in one or more layers, it is dried. Preferably after 12 hours or more, the semi-opaque layer of the paint comprising the spherical particles as described above can be applied. Also this top paint can be applied in two or more layers, although one layer may also be used if so desired.

A special textile, linen-like effect can be obtained if the top paint comprising the spherical particles as described above is applied, e.g., by means of a medium hair roller or other suitable means, in two or more layers, and subsequently a mattress of a fibrous material, preferably of stiff parallel projecting fibres such as synthetic grass fibres, is dragged over the fresh paint layer.

Alternatively, the top paint can be applied by brush, preferably of medium size, in cross-way. This gives, a cloudy, suede-like effect.

The present invention also pertains to a set of paint products including an opaque paint and an emulsion paint with spherical particles as defined above. Such a set may also include a tool with a mattress of a fibrous material, preferably of stiff parallel projecting fibres such as synthetic grass fibres. Alternatively or additionally, such a set may include a roller and/or a brush.

The invention is further illustrated by the following examples.

EXAMPLE 1

A primer was used based on an aqueous emulsion of a styrene acrylate binder (Hydropliolite®, available from Eliokem) and comprising inorganic pigments, such as titanium dioxide, talc, calcium carbonate or mica pigments.

Two layers of the primer were applied using a medium hair roller. The layers were dried for 12 hours and were completely hiding.

Subsequently, a paint based on an aqueous emulsion of a styrene acrylate copolymer (11% solids) was applied as a semi-opaque layer. The paint comprised 18% by weight of spherical aliphatic polyurethane particles which were pre-pigmented with titanium dioxide (13.5% by weight based on the total weight of the polyurethane particles). These particles are available under the brand name Decol® 40.

Two layers of the top coat were applied by brush on the dried primer layers in cross-way. After drying, the paint layer had a soft and suede-like touch as well as a suede look.

EXAMPLE 2

A primer was applied as in Example 1. The same top coat was used, except that this time it was applied by a medium hair roller, again in two layers. Subsequently a tool was used comprising a blade having a flat side provided with stiff parallel synthetic fibres, similar to synthetic grass. This fibrous flat side of the tool was dragged over the freshly applied top coat layers in two directions. A textile, linen-like effect was the result.

We claim:

1. A method of painting a substrate with an emulsion paint comprising spherical polymer particles, comprising the steps of:
    applying an opaque first coating in at least one opaque layer, said first coating being a water-borne emulsion of a styrene acrylic copolymer; and
    applying said emulsion paint comprising spherical polymer particles in at least one semi-opaque-layer over the opaque first coating,
    wherein the spherical polymer particles in the emulsion paint show a particle size distribution in which 3-10% of the particles have a particle size between 63-90 micrometers and 25-40% have a particle size between 40-63 micrometers; and
    wherein spherical particles are pre-pigmented, the pigment content of the particles being between 3-40 wt %.

2. The method according to claim 1, wherein the at least one opaque layer is a first color and the at least one semi-opaque layer is a second color, and the first color and the second color are corresponding.

3. The method according to claim 1, wherein the opaque first coating is pigmented.

4. The method according to claim 1, wherein the at least one semi-opaque layer is applied by brush in cross-way fashion.

5. The method according to claim 1, wherein the at least one semi-opaque layer is applied by a roller and, further comprising:
    dragging a flat side of a tool provided with fibrous material over the freshly applied semi-opaque layer.

6. The method according to claim 5, wherein the fibrous material comprises stiff parallel projecting fibers.

7. The method according to claim 5, wherein the fibrous material comprises synthetic grass fibers.

* * * * *